United States Patent
Jung et al.

(10) Patent No.: US 12,405,346 B2
(45) Date of Patent: Sep. 2, 2025

(54) INDOOR POSITIONING METHOD, COMPUTER PROGRAM AND SYSTEM

(71) Applicant: VESTELLALAB INC., Seoul (KR)

(72) Inventors: Sangsu Jung, Uiwang-si (KR); Dhananjay Singh, Yongin-si (KR); Yung Ji Choi, Seongnam-si (KR); Young Soo Lee, Gunpo-si (KR)

(73) Assignee: VESTELLALAB INC., Seoul (KR)

( * ) Notice: Subject to any disclaimer, the term of this patent is extended or adjusted under 35 U.S.C. 154(b) by 0 days.

(21) Appl. No.: 18/008,952

(22) PCT Filed: Aug. 18, 2022

(86) PCT No.: PCT/KR2022/012359
§ 371 (c)(1),
(2) Date: Dec. 7, 2022

(87) PCT Pub. No.: WO2023/106551
PCT Pub. Date: Jun. 15, 2023

(65) Prior Publication Data
US 2024/0272263 A1    Aug. 15, 2024

(30) Foreign Application Priority Data
Dec. 7, 2021    (KR) .................. 10-2021-0174116

(51) Int. Cl.
*G01S 5/02*    (2010.01)
*G01C 21/20*   (2006.01)
*H04B 17/318*  (2015.01)

(52) U.S. Cl.
CPC .......... *G01S 5/0244* (2020.05); *G01C 21/206* (2013.01); *H04B 17/318* (2015.01); *G01S 2205/02* (2020.05)

(58) Field of Classification Search
CPC ...... G01S 5/0244; G01S 2205/02; G01S 5/02; G01S 5/0205; G01S 5/0278;
(Continued)

(56) References Cited

U.S. PATENT DOCUMENTS

2014/0274119 A1*  9/2014  Venkatraman ........ H04W 64/00
                                                    455/456.1
2015/0133150 A1*  5/2015  Shin ...................... H04W 4/029
                                                    455/456.1

(Continued)

*Primary Examiner* — Don N Vo
(74) *Attorney, Agent, or Firm* — Maschoff Brennan

(57) ABSTRACT

Embodiments of the present disclosure provide an indoor positioning method for measuring a location of a mobile terminal using the mobile terminal and a plurality of positioning sensors communicating therewith. The indoor positioning method includes selecting a period for acquiring sensor information related to a relationship between the mobile terminal and the positioning sensors; acquiring a variable group corresponding to a positioning sensor selected from among the plurality of positioning sensors for each of unit periods of the selected period, the sensor information being acquired from the plurality of positioning sensors; applying a probability inference method to the variable group; and acquiring a final location of the mobile terminal based on the probability inference method, wherein the sensor information comprises signal strengths received by the mobile terminal from the positioning sensors, and a unique identification of the positioning sensors.

15 Claims, 10 Drawing Sheets

(58) Field of Classification Search
CPC ...... G01C 21/206; H04B 17/318; G06N 5/04; G06N 7/00; G06N 7/01
USPC ...................................... 455/456.1
See application file for complete search history.

(56) References Cited

U.S. PATENT DOCUMENTS

2015/0138019 A1\* 5/2015 Gupta .................. G01C 15/00
   342/452
2015/0149042 A1\* 5/2015 Cooper ................ B60R 25/245
   701/48
2016/0330584 A1\* 11/2016 Akpinar ................... G01S 5/14
2018/0217248 A1\* 8/2018 Nakayama .............. G01S 3/043

\* cited by examiner

[FIG. 1]
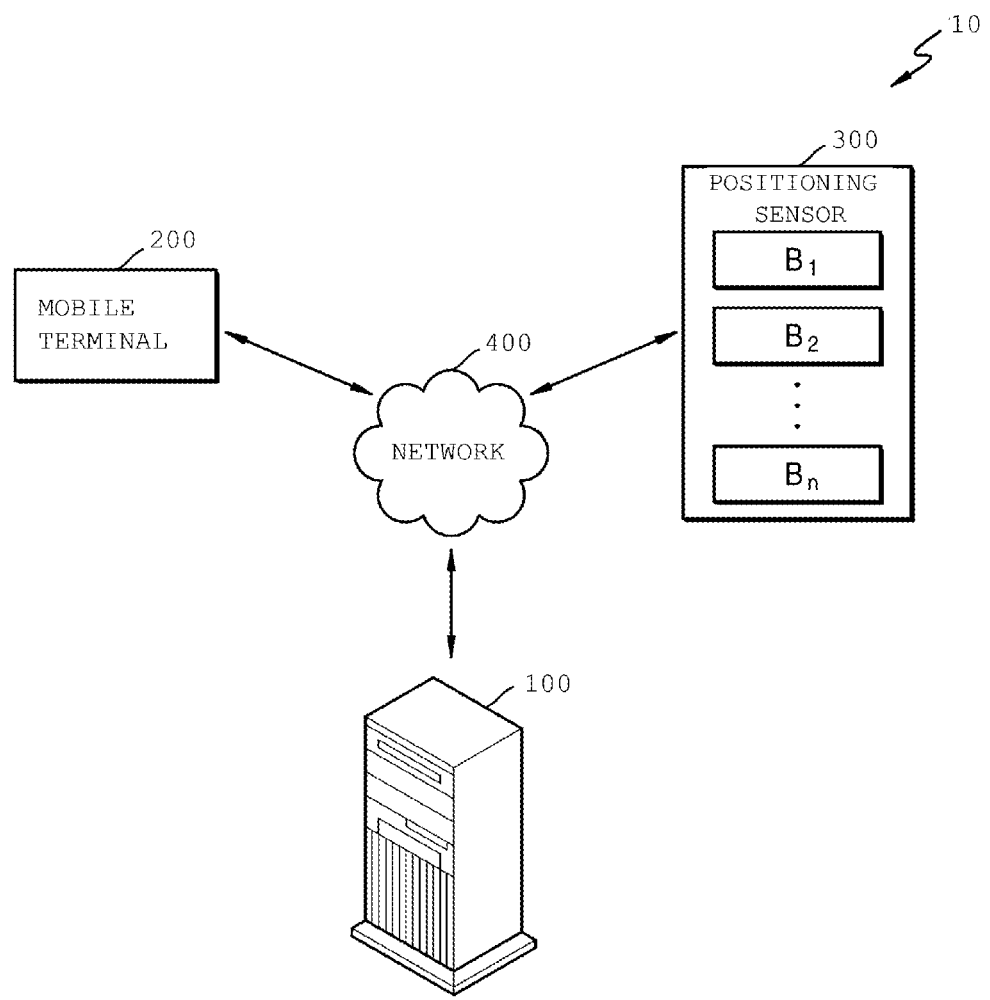

[FIG. 2]
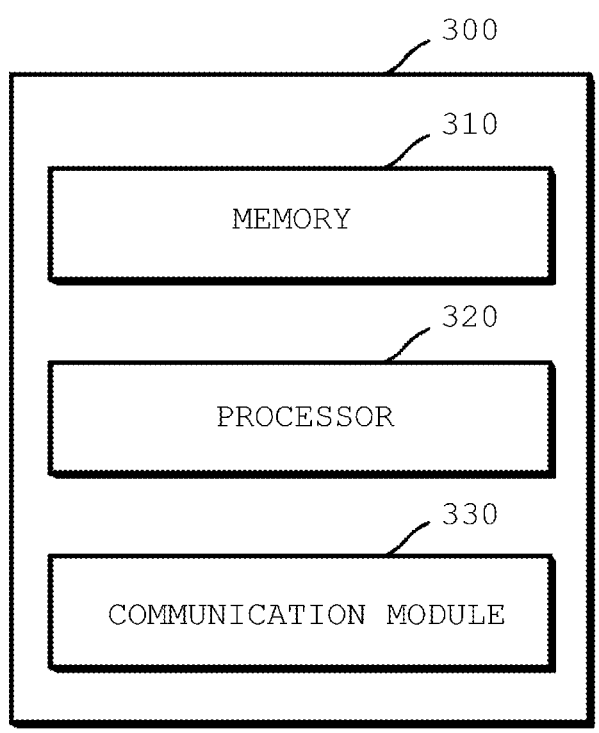

[FIG. 3]
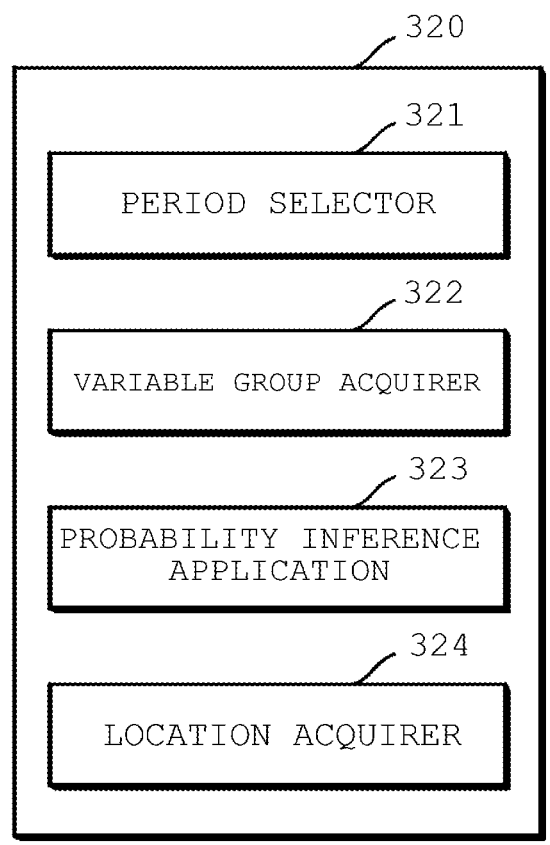

[FIG. 4]
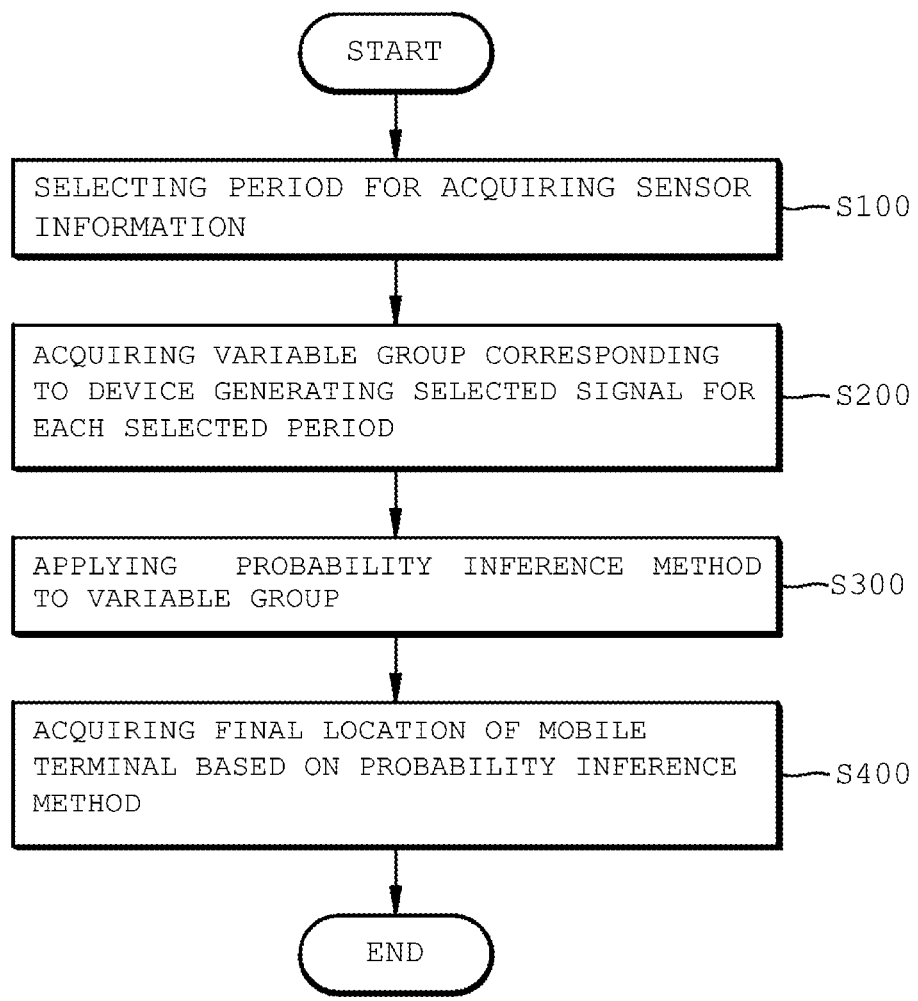

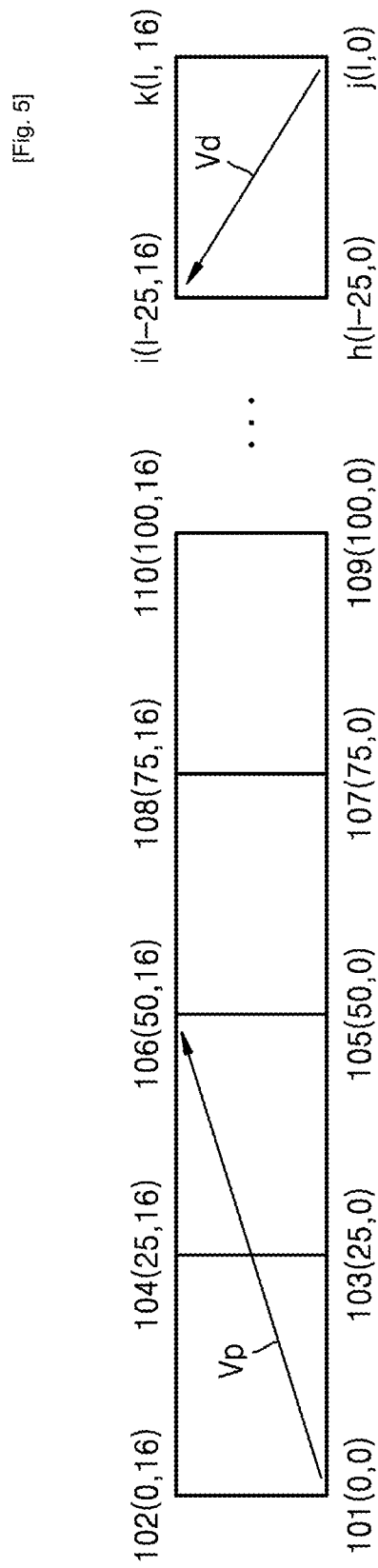

[FIG. 6]
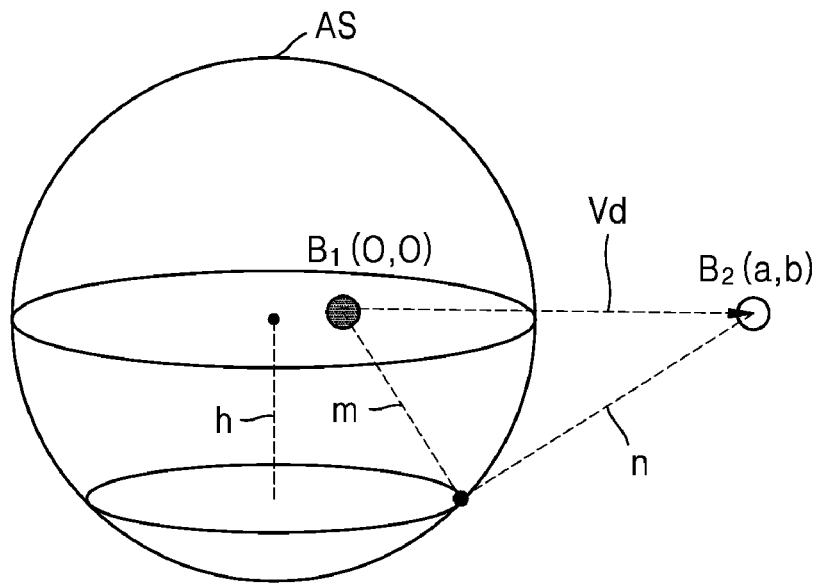
[FIG. 7]
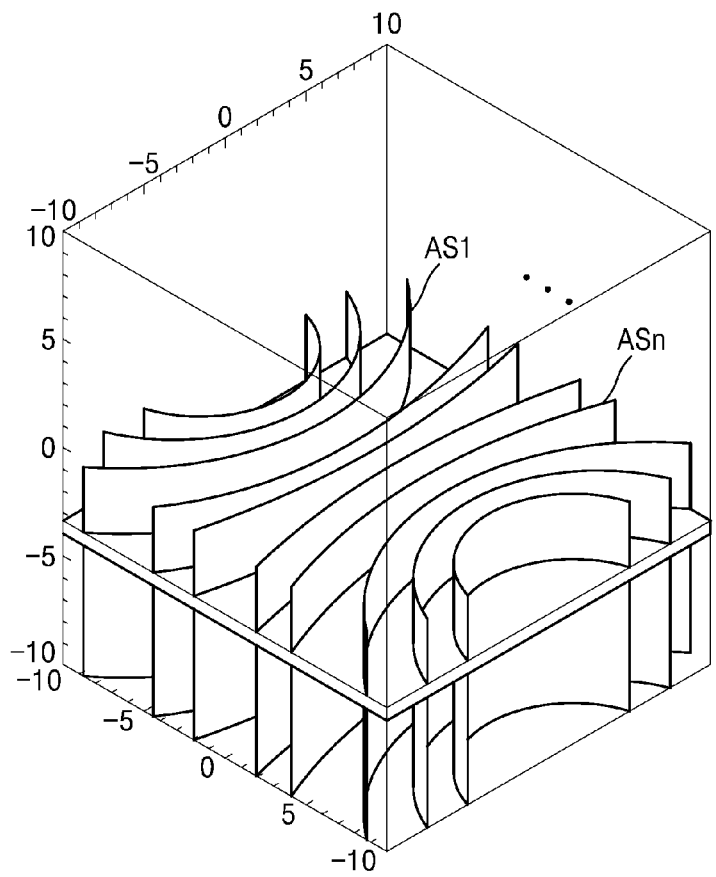

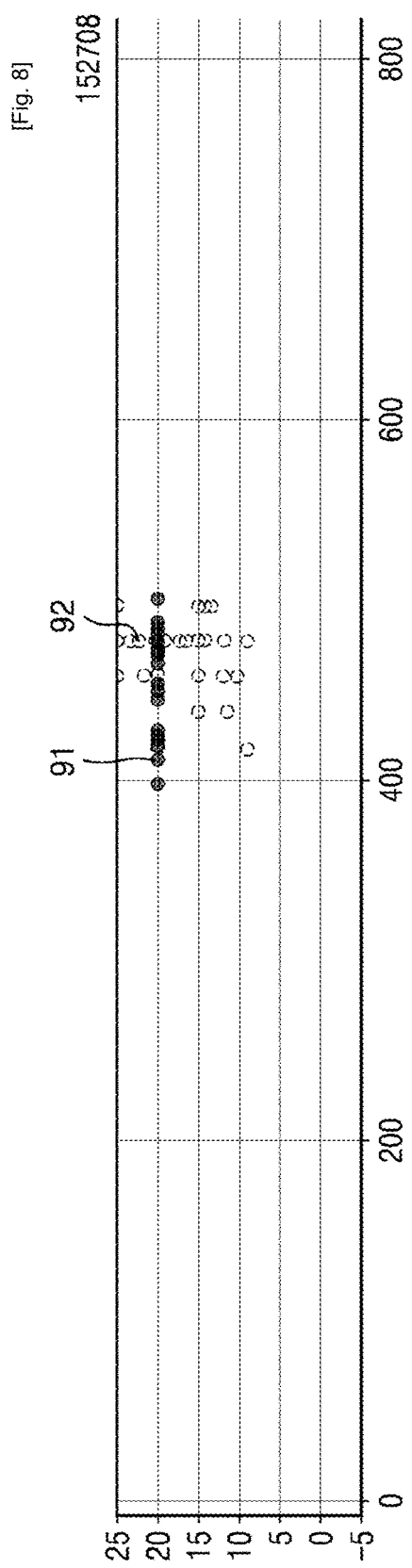

[FIG. 9]
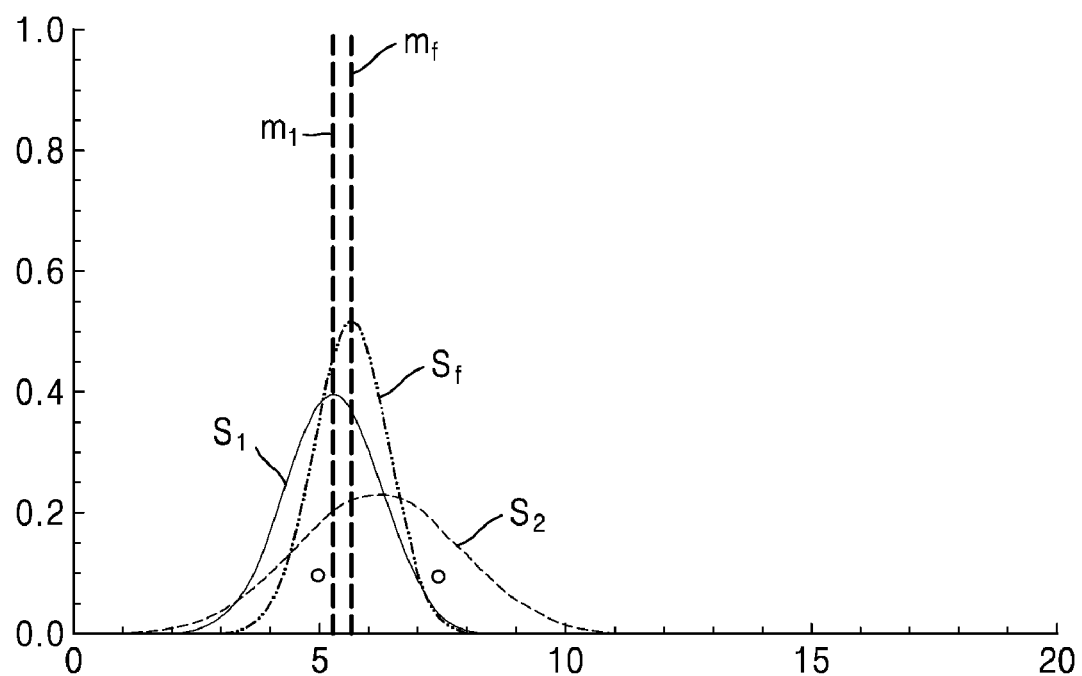

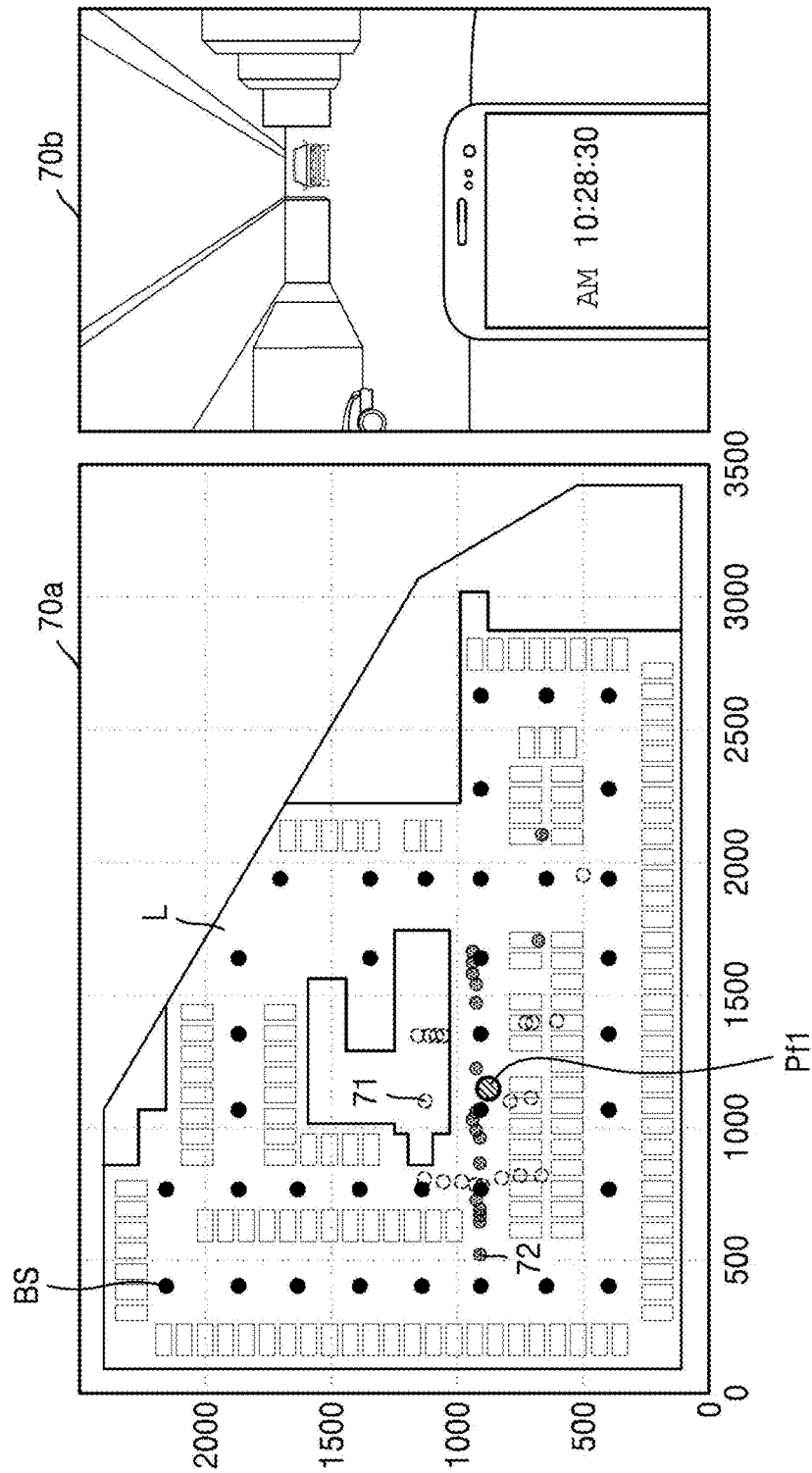

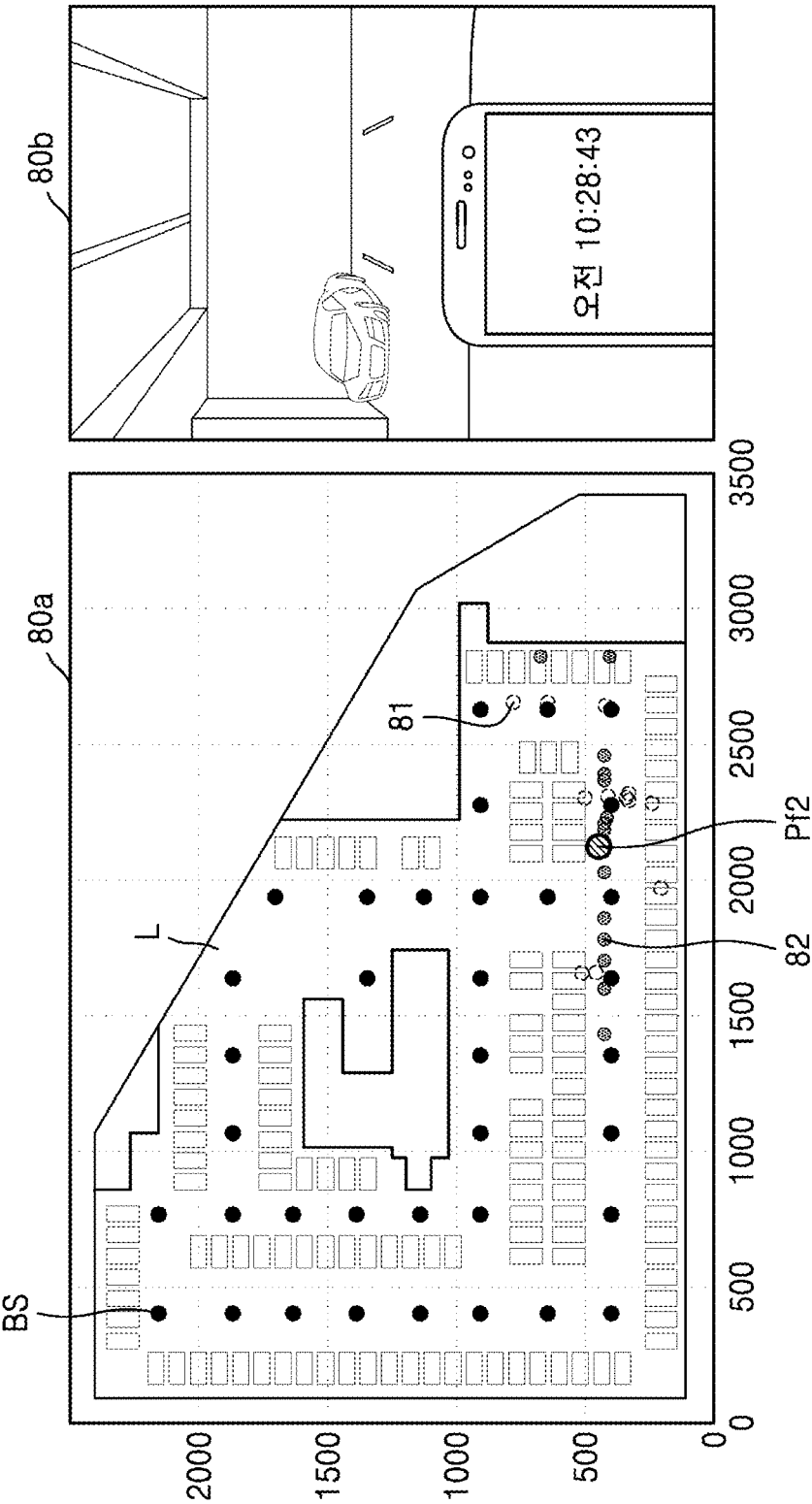

INDOOR POSITIONING METHOD, COMPUTER PROGRAM AND SYSTEM

TECHNICAL FIELD

The present disclosure relates to an indoor positioning method, a computer program and a system.

BACKGROUND ART

Recently, research and development on V2X (Vehicle to Everything) has been actively carried out. V2X communication represents a communication method by which a traveling vehicle communicates with all surrounding elements (such as road infrastructure, other vehicles, pedestrians, and networks) to exchange or share information such as the location of the vehicle, surrounding location information, and traffic conditions. V2X-based services may provide an autonomous driving service, a vehicle remote control service, and a large-capacity short-distance service such as AR and VR.

Positioning technology for finding the locations of vehicles is essential for autonomous vehicles for safe driving. In general, a location may be determined using a GPS signal in an outdoor environment. In the outdoor environment, the influence of structures or obstacles that interfere with signal transmission and reception is trivial, and the error of signal transmission and reception is not large. However, in indoor spaces such as parking lots, GPS signal reception may fail or the error may raise an issue due to internal structures such as ceilings, walls, and pillars. In a parking lot, the distance between paths is excessively close compared to the precision of GPS. In particular, in an underground parking lot, vehicles cannot receive GPS signals, and therefore the accuracy of positioning is lowered. Moreover, in autonomous driving, indoor positioning technology that capable of accurately and quickly measuring the location of a vehicle that changes in real time is required for safe driving, parking, and the like. In addition, in indoor environments, when the final position of the moving object is calculated as a specific point, the accuracy thereof is low and it is difficult to combine the calculation result with other sensor information.

DISCLOSURE

Technical Problem

An object of the embodiments of the present disclosure is to provide an indoor positioning method, computer program and system capable of precisely and accurately positioning a moving object even in an indoor space.

Another object of embodiments of the present disclosure is to provide an indoor positioning method, computer program and system capable of improving the accuracy of estimating the location of a moving object by outputting an estimated result related to the location of the moving object as a probability distribution so as to be easily processed and combined with other sensor information according to the user's need.

Technical Solution

In accordance with one aspect of the present disclosure, provided is an indoor positioning method for measuring a location of a mobile terminal using the mobile terminal and a plurality of positioning sensors communicating therewith, the method including selecting a period for acquiring sensor information related to relationship between the mobile terminal and the positioning sensors; acquiring a variable group corresponding to a positioning sensor selected from among the plurality of positioning sensors for each of unit periods of the selected period, the sensor information being acquired from the plurality of positioning sensors; applying a probability inference method to the variable group; and acquiring a final location of the mobile terminal based on the probability inference method, wherein the sensor information comprises signal strengths received by the mobile terminal from the positioning sensors, and a unique identification of the positioning sensors.

The acquiring of the variable group may include: selecting a positioning sensor group included in a sensor information receiving range from among the plurality of positioning sensors for each of the unit periods, the positioning sensor group comprising at least two positioning sensors; selecting a possible positioning sensor pair for the selected positioning sensor group for each of the unit periods; acquiring combination data about the positioning sensor pair for each of the unit periods; and acquiring the variable group based on the combination data.

The combination data may include: a distance ratio between the mobile terminal and each of the two positioning sensors constituting the positioning sensor pair; a first vector configured by absolute coordinates of each of the two positioning sensors constituting the positioning sensor pair; and a second vector configured by relative coordinates of one of the two positioning sensors constituting the positioning sensor pair with respect to the other one of the positioning sensors.

The variable group may include: information on a Apollonius' sphere calculated based on the unique identification and signal strength of the positioning sensor pair, the information including: the Apollonius sphere configured with the combination data for each of the unit periods; and a plurality of intercepts of the Apollonius sphere for each of the unit periods.

When the number of positioning sensors selected as the positioning sensor group is k (where k is a natural number satisfying $2 \leq i \leq n$), the positioning sensor pair may include positioning sensor pairs acquired as many as a combination $_kC_2$.

The applying of the probability inference method may include applying a Bayesian inference technique to the combination data, the applying of the Bayesian inference technique may include: selecting at least two sample data from a plurality of variable groups; and calculating a probability distribution related to the location of the mobile terminal having a form of normal distribution by multiplying each of the selected sample data by a corresponding filter function.

The acquiring of the final location of the mobile terminal may include calculating a circular distribution composed of a representative value selected from a median or a mean of the probability distribution, and a standard deviation distributed around the median.

In accordance with another aspect of the present disclosure, provided is a computer program stored in a recording medium for executing the method according to the above-described embodiments using a computer.

In accordance with another aspect of the present disclosure, provided is an indoor positioning system including an indoor positioning server configured to communicate with a mobile terminal and a plurality of positioning sensors, wherein the indoor positioning server is configured to: select a period for acquiring sensor information related to a relationship between the mobile terminal and the positioning sensors; acquire a variable group corresponding to a positioning sensor selected from among the plurality of positioning sensors for each of unit periods of the selected period, the sensor information being acquired from the plurality of positioning sensors; apply a probability inference method to the variable group; and acquire a final location of the mobile terminal based on the probability inference method, wherein the sensor information may include signal strengths received by the mobile terminal from the positioning sensors, and a unique identification of the positioning sensors.

In acquiring the variable group, the indoor positioning server is configured to: select a positioning sensor group included in a sensor information receiving range from among the plurality of positioning sensors for each of the unit periods, the positioning sensor group comprising at least two positioning sensors; select a possible positioning sensor pair for the selected positioning sensor group for each of the unit periods; acquire combination data about the positioning sensor pair for each of the unit periods; and acquire the variable group based on the combination data.

The combination data may include: a distance ratio between the mobile terminal and each of the two positioning sensors constituting the positioning sensor pair; a first vector configured by absolute coordinates of each of the two positioning sensors constituting the positioning sensor pair; and a second vector configured by relative coordinates of one of the two positioning sensors constituting the positioning sensor pair with respect to the other one of the positioning sensors.

The variable group may include: information on a Apollonius' sphere calculated based on the unique identification and signal strength of the positioning sensor pair, the information including: the Apollonius sphere configured with the combination data for each of the unit periods; and a plurality of intercepts of the Apollonius sphere for each of the unit periods.

When the number of positioning sensors selected as the positioning sensor group is k (where k is a natural number satisfying 2≤i≤n), the positioning sensor pair may include positioning sensor pairs acquired as many as a combination $_kC_2$.

In applying the probability inference method, the indoor positioning server may be configured to apply a Bayesian inference technique to the combination data, the applying of the Bayesian inference technique may include: select at least two sample data from a plurality of variable groups; and calculate a probability distribution related to the location of the mobile terminal having a form of normal distribution by multiplying each of the selected sample data by a corresponding filter function.

In acquiring the final location of the mobile terminal, the indoor positioning server may be configured to calculate a circular distribution composed of a representative value selected from a median or a mean of the probability distribution, and a standard deviation distributed around the median.

Advantageous Effects

With an indoor positioning method, computer program and system according to an embodiment of the present disclosure, positioning of a moving object may be precise and accurate even in an indoor space.

In addition, as an estimated result related to the location of the moving object is output as a probability distribution, it may be easily processed and combined with other sensor information according to the user's need. Accordingly, the accuracy of estimation of the location of the moving object may be improved.

DESCRIPTION OF DRAWINGS

FIG. 1 is a diagram illustrating a configuration of an indoor positioning system including an indoor positioning server according to an embodiment of the present invention.

FIG. 2 is a block diagram schematically illustrating a configuration of the indoor positioning device according to an embodiment of the present disclosure.

FIG. 3 is a block diagram illustrating in more detail a part of the indoor positioning device according to an embodiment of the present disclosure.

FIG. 4 is a flowchart illustrating an indoor positioning method according to an embodiment of the present disclosure.

FIG. 5 is a diagram illustrating a method of acquiring combination data according to an embodiment of the present disclosure.

FIG. 6 is a schematic diagram illustrating an exemplary method of calculating a variable group acquired according to an indoor positioning method according to an embodiment of the present disclosure.

FIG. 7 is a diagram illustrating an example of the variable group acquired according to the indoor positioning method according to an embodiment of the present disclosure.

FIG. 8 is a diagram illustrating another example of the variable group acquired according to the indoor positioning method according to an embodiment of the present disclosure.

FIG. 9 is a diagram for illustration a probability inference method applied to the indoor positioning method according to an embodiment of the present disclosure.

FIG. 10 is a schematic diagram illustrating a method of calculating a final location of a mobile terminal at a point of time according to the indoor positioning method according to an embodiment of the present disclosure.

FIG. 11 is a schematic diagram illustrating a method of calculating a final location of a mobile terminal at another point of time according to the indoor positioning method according to an embodiment of the present disclosure.

BEST MODE

The present disclosure may be subjected to various changes and may have various embodiments, and specific embodiments will be described in detail with reference to the accompanying drawings. The advantageous effects and features of the present invention and the manner of achieving the same will become apparent from the embodiments described in detail below with reference to the accompanying drawings. It should be noted, however, that the present disclosure may be embodied in many different forms and is not limited to the embodiments set forth herein.

Reference will now be made in detail to embodiments of the present disclosure, examples of which are illustrated in the accompanying drawings. Wherever possible, the same reference numbers will be used throughout the drawings to refer to the same or like parts, and redundant description thereof will be skipped.

In the embodiments are described below, terms such as first and second are used for the purpose of distinguishing one component from another, without limiting the meaning of the components. As used herein, the singular forms "a", "an", and "the" include plural referents unless context clearly dictates otherwise. In present disclosure, terms such as "include" or "have" are intended to indicate existence of figures or components disclosed herein. Such terms should be understood as not precluding possibility of existence or addition of one or more other figures or components.

In the drawings, components may not be drawn to scale for simplicity. For example, the dimensions and thickness of each component shown in the drawings are arbitrarily selected for simplicity, and the present disclosure is not necessarily limited thereto.

In the following embodiments, when a part such as a region, component, unit, block or module is described as being placed on another part, presence of another region, component, unit, block or module between the parts is not excluded. Also, when a region, component, unit, block or module is connected to another, the regions, components, units, blocks or modules may be directly connected, but may be indirectly connected with another region, component, unit, block or module interposed therebetween.

In this specification, terms such as "unit," "module," "device," "terminal," "server," or "system" may be construed as referring to a combination of hardware and software driven by the hardware. For example, the hardware may be a data processing device including a CPU or another processor. In addition, the software driven by the hardware may refer to a running process, an object, an executable file, a thread of execution, a program, or the like.

In the following description, "app" may represent "application."

FIG. 1 is a diagram illustrating a configuration of an indoor positioning system 10 including an indoor positioning server 100 according to an embodiment of the present disclosure. The indoor positioning server 100 of the present disclosure communicates with a mobile terminal 200 and a positioning sensor 300 over a network 400, and may measure a real-time location of the mobile terminal 200. In the following description, the positioning method or system of the present disclosure is referred to "indoor positioning." However, according to embodiments, it is not limited to positioning in an indoor space and may be applied to various outdoor spaces.

The indoor positioning server 100 is a device configured to perform positioning of the mobile terminal 200. While shown in the figure as a separate block from the mobile terminal 200, the indoor positioning server 100 may be provided as an internal processor of the mobile terminal 200 to measure the real-time location of the mobile terminal 200 according to embodiments. The indoor positioning server 100 may be a cloud server, but is not limited thereto.

The mobile terminal 200 is a device corresponding to various moving objects. An example of the various moving objects may be a vehicle. The mobile terminal 200 may include a wireless communication module, which may be, for example, a Bluetooth module. For example, the mobile terminal 200 may be a portable terminal such as a mobile phone or a tablet PC possessed by the owner of a vehicle, or may be an electronic device connected to or embedded in the vehicle. The location of the mobile terminal 200 may change in real time as it moves within a specific space. For example, the specific space may be various indoor spaces or outdoor spaces containing hindrances to receiving GPS signals, such as indoor/underground parking lots, tunnels, underpasses, underground shopping malls, and inside of buildings.

The positioning sensor 300 may determine the location of the mobile terminal 200 by transmitting an identifiable wireless signal to the mobile terminal 200 over a radio network. The positioning sensor 300 of the present disclosure may include a plurality of positioning sensors 300 (B1, B2, . . . , Bn). A unique identification for identifying a corresponding one of the positioning sensors 300 may be assigned to each of the positioning sensors. The unique identification may include ID information and coordinates of the positioning sensor 300 in a selected coordinate system (a practical coordinate system such as a relative coordinate system or an absolute coordinate system).

The positioning sensor 300 may be related to, for example, a Bluetooth Low Energy (BLE) beacon. In this case, it may transmit a beacon signal to the mobile terminal 200. The beacon signal may include a beacon ID as a unique identification of each beacon. The beacon ID may include at least one of a universally unique identifier (UUID), a major ID, a minor ID, and a received signal strength indication (RSSI). As an example of the ID configuration, the above-mentioned major ID and/or minor ID may be configured as a three-digit number, wherein a unique number for each layer may be allocated in the hundredth place, and a unique number for each beacon may be allocated in the tenth and one place. The RSSI corresponds to the strength of the beacon signal.

The mobile terminal 200 and each of the plurality of positioning sensors 300 (B1, B2, . . . , Bn) may communicate over the network 400 to exchange data with each other.

The network 400 may serve to mediate data transmission/reception between the indoor positioning server 100 and other components. The method of communication among the indoor positioning server 100, the mobile terminal 200, the positioning sensor 300, and/or other components not shown in this figure is not limited, and the network 400 may include a wired and/or wireless communication network. For example, the network 400 may include wired networks such as Local Area Networks (LANs), Wide Area Networks (WANs), Metropolitan Area Networks (MANs), Integrated Service Digital Networks (ISDNs), or wireless networks such as wireless LANs, CDMA, Bluetooth, and satellite communication space, but the scope of the present disclosure is not limited thereto.

Of course, the network environment in which the indoor positioning server 100 of the present disclosure operates may further include other components necessary for positioning of the mobile terminal 200 not shown in this figure.

FIG. 2 is a block diagram schematically showing the configuration of the indoor positioning server 100 according to an embodiment of the present disclosure. The indoor positioning server 100 may include a communication module 110, a processor 120, and a memory 130.

The communication module 110 may communicate with various types of external devices and servers according to various types of communication methods. The communication module 110 may be connected to a communication module of another device or server by the network 400 to exchange data therewith.

The processor 120 may control overall operations of the indoor positioning server 100 having a memory, using various programs stored in the memory. The processor 120 may include processing devices such as a microprocessor, a central processing unit (CPU), a processor core, a multiprocessor, an application-specific integrated circuit (ASIC), and a field programmable gate array (FPGA), but the present disclosure is not limited thereto. The operations of the indoor positioning server 100 may be performed while the processor 120 communicates with communication modules of other components.

The processor 120 may communicate with the mobile terminal 200 and the plurality of positioning sensors 300. The processor 120 may select a period (acquisition period) of acquisition of sensor information related to the relationship between the mobile terminal 200 and the positioning sensors 300. The sensor information may include a strength of a signal received by the mobile terminal 200 from the positioning sensor 300 and a unique identification of the positioning sensor 300. Thereafter, for each unit period of the selected acquisition period, a variable group corresponding to the selected positioning sensor among the plurality of positioning sensors may be acquired. Thereafter, a probability inference method may be applied to the variable group, and the final location of the mobile terminal 200 may be obtained based on the probability inference method. For example, when the selected period is 1 second (sec), a plurality of pieces of sensor information may be acquired every 1 second, which is a unit period. Also, at least two samples may be selected for the variable group every 1 second and the probability inference method may be applied to precisely measure the indoor location of the mobile terminal 200.

The specific operation of the processor 120 will be described in more detail in the related drawings to be described later.

The memory 130 may temporarily or permanently store data processed by the indoor positioning server 100. The memory 130 may include a random access memory (RAM), a read only memory (ROM), and a permanent mass storage device such as a disk drive, but the present disclosure is not limited thereto.

The indoor positioning server 100 may further include a storage medium (not shown) storing various data for the overall operations, such as a program for processing or controlling the processor 120. The storage medium may store a plurality of application programs (or applications) driven by the indoor positioning server 100 and/or data for the operation of the user terminal 100, and instructions. At least some of the applications may be downloaded from an external server through wireless communication. In addition, at least some of the applications may be present on the indoor positioning server 100 from the time of shipment for the basic functionality of the indoor positioning server 100. The application programs may be stored in the storage medium and driven to perform an operation (or function) of the indoor positioning server 100 by the processor 120.

Although not shown in this figure, the indoor positioning server 100 (or the mobile terminal 200) may further include a display and/or an input/output interface other than the display. The display may display data input/output through the indoor positioning server 100. The display may display the positioning data processed and output by the indoor positioning method according to an embodiment of the present disclosure by an output method according to the operation of the processor 120. As an example, FIGS. 8 and 9, which will be described later, are exemplary views of a screen images output through the display (not shown).

Each element constituting the aforementioned indoor positioning server 100 is not necessarily limited to referring to separate devices physically separated from each other. The communication module 110, the processor 120, and the memory 130 of FIG. 2 are only functionally classified according to the operations performed by the indoor positioning server 100, and do not need to be distinguished independently of each other. Of course, according to embodiments, they may be implemented as separate devices physically separated from each other. In addition, although not shown in this figure, the indoor positioning server 100 may further include other components necessary for the implementation of the present disclosure.

The indoor positioning server 100 has been described above. Similarly to the indoor positioning server 100, the mobile terminal 200 and the positioning sensor 300 described above with reference to FIG. 1 may each include a communication module, a processor and a memory.

Hereinafter, the operation of the indoor positioning server 100 will be described along with the detailed configuration of the processor 120.

FIG. 3 is a block diagram illustrating in more detail the configuration of the processor 120, which is a part of the indoor positioning server 100 according to an embodiment of the present disclosure. The processor 120 may include a period selector 121, a variable group acquirer 122, a probability inference application 123, and a location acquirer 124.

The period selector 121 may select a period for acquiring sensor information related to the relationship between the mobile terminal 200 and the positioning sensor 300. Here, the sensor information may include a strength of a signal received by the mobile terminal 200 from the positioning sensor 300 and a unique identification of the positioning sensor 300 as described above. The operation of the period selector 121 will be described in more detail later with reference to FIG. 5.

The variable group acquirer 122 may acquire a variable group corresponding to the selected location sensor among the plurality of location sensors 300 from which the sensor information is acquired, that is, sample data (or a sample) for each unit period of the selected period. The operation of the variable group acquirer 122 will be described in more detail later with reference to FIGS. 6 to 8.

The probability inference application 123 may apply a probability inference method to the variable group. The operation of the probability inference application 123 will be described in more detail later with reference to FIG. 9.

The location acquirer 124 may acquire the final location of the mobile terminal 200 based on the probability inference method. An output result by the operation of the position acquirer 124 will be described in more detail later with reference to FIGS. 10 and 11.

The components shown in FIG. 3 are merely functionally classified according to the operations performed by the processor 120, and do not need to be distinguished independently of each other. Of course, according to embodiments, they may be implemented as separate devices physically separated from each other.

FIG. 4 is a flowchart illustrating an indoor positioning method according to an embodiment of the present disclosure. Methods to be described later may be carried out by the processor 120 of the indoor positioning server 100.

In operation S100, a period for acquiring sensor information related to the relationship between the mobile terminal 200 and the positioning sensor 300 (hereinafter, simply referred to as an "acquisition period") is selected. That is, when the acquisition period is selected as 't', the sensor information may be acquired at points of time that are multiples (t, 2t, . . . , nt) of the acquisition period. For example, in operation S100, the acquisition period may be selected as 1 second (sec). In this case, the unit period is 1 sec. When the starting point of time is '0', the sensor information may be acquired at points corresponding to 1 sec, 2 sec, . . . , and n sec, or all sensor information in the entire period may be acquired. As another example, when the acquisition period is selected as 300 milliseconds (ms), the unit period may be 300 ms, and the sensor information may be acquired at points corresponding to 300 ms, 600 ms, . . . , 300*n ms. Although the acquisition period has been described as 1 sec or 300 ms as an example, it may be a unit smaller than 1 sec or may be a unit longer than 1 sec according to an embodiment. The acquisition period is not limited to the above example, and may be variously employed within the scope of the present disclosure that may achieve the purpose of real-time positioning.

The sensor information may include a strength of a signal received by the mobile terminal 200 from the positioning sensor 300 and a unique identification of the positioning sensor 300. The signal strength may be the aforementioned RSSI. The unique identification may include ID information about the aforementioned positioning sensor 300 and coordinates corresponding to the ID information.

As an example, the difference in signal strength between the different positioning sensors 300 may be proportional to a ratio of distance between the mobile terminal 200 and the positioning sensors 300. The difference in signal strength may be acquired based on the signal strength and the unique identification acquired in operation S100. Specifically, operation S100 will be described with reference to the following equations. In Equation 1 (A=−20 log [$r_a$]+$RSSI_0$) and Equation 2 (A=−20 log [$r_b$]+$RSSI_0$), A and B are defined as signal strengths of two positioning sensors B1 and B2 (see FIG. 1), respectively, and $r_a$ and $r_b$ are defined as distances from the mobile terminal 200 to the two positioning sensors B1 and B2.

In this case, the ratio ($r_b/r_a$) of the distances between the mobile terminal 200 and the two positioning sensors B1 and B2 is proportional to the difference in signal strength (|A−B|), and therefore the distance ratio ($r_b/r_a$) may be calculated based on the signal strength of each of the positioning sensors 300. According to an embodiment, the distance ratio ($r_b/r_a$) may be calculated based on not only the signal strengths of the positioning sensors 300 but also the unique identifications.

A specific example of the sensor information will be described in more detail later with reference to FIG. 5.

For each unit period of the period selected in operation S200, a variable group corresponding to the positioning sensor selected from among the plurality of positioning sensors 300 may be acquired. The operation S200 of acquiring the variable group may include operations S210 to S240 (not shown), which will be described later.

First, a "positioning sensor group" included in a sensor information reception range is selected among the plurality of positioning sensors 300 for each unit period, and the group includes at least two positioning sensors 300 (S210). Thereafter, a possible pair of positioning sensors may be selected for the positioning sensor group selected for each unit period (S220). Operations S210 and S220 will be described in more detail with reference to Table 1 below.

| time   | minor | rssi |
|--------|-------|------|
| 15:26:4 | 153   | −68  |
| 15:26:4 | 151   | −54  |
| 15:26:4 | 155   | −71  |
| 15:26:5 | 153   | −66  |
| 15:26:5 | 151   | −55  |
| 15:26:5 | 155   | −71  |

-continued

| time   | minor | rssi |
|--------|-------|------|
| 15:26:5 | 153   | −67  |
| 15:26:5 | 151   | −55  |
| 15:26:5 | 155   | −72  |
| 15:26:6 | 147   | −87  |
| 15:26:6 | 153   | −63  |
| 15:26:6 | 151   | −49  |
| 15:26:6 | 153   | −62  |
| 15:26:6 | 151   | −50  |
| 15:26:6 | 155   | −69  |
| 15:26:6 | 147   | −88  |
| 15:26:6 | 153   | −63  |
| 15:26:6 | 152   | −73  |
| 15:26:6 | 151   | −55  |
| 15:26:6 | 155   | −70  |

Table 1 shows sensor information (unique identification (minor) and signal strength (rssi) of the positioning sensor) acquired for each unit period of the selected period. Table 1 shows an example in which that an acquisition period is selected as 1 sec and the sensor information is acquired at each point of time of each unit period of "15:26:4 (t1), 15:26:5 (t2), and 15:26:6 (t3)." ~~~~ For example, in t1, as a positioning sensor group, three positioning sensors 300 having unique identifications of 151, 153, and 155, respectively (hereinafter, a positioning sensors having three-digit identification value abc may be referred to as an "abc sensor"). The rightmost column shows the signal strength rssi received by the mobile terminal 200 from each positioning sensor 300 at point t1. In t2 corresponding to the next unit period, 151, 153, and 155 sensors are selected as the positioning sensor group in a similar manner. Next, in t3, positioning sensors 300 having identification values of 147 and 152 other than the 151, 153, and 155 sensors are further selected as the positioning sensor group. In this case, at the time t3, the number of sensors in the range within which the sensor information may be found is increased as the reception radius for the sensor information is changed due to a change of the movement section of the mobile terminal 200 (for example, the change of the movement section by passing the corner point B or an intersection) or an increase in the speed of movement.

As described above, the sensor information may refer to information acquired in each unit period by a positioning sensor corresponding thereto, or may mean information accumulated and received at successive time points distributed between time points from different unit periods. For example, when the acquisition period is selected as 1 second as shown in Table 1 above (t1 is defined as 1 second and t2 is defined as 2 seconds), the sensor information according to the present disclosure may be information acquired at time points of 1.000 seconds and 2.000 seconds. According to embodiments, it may mean a concept including information values by the positioning sensor accumulated and received for 0.000 to 0.999 seconds (that is, a period above 0 second and below 1 second) and for 1.000 to 1.999 seconds (that is, a period above 1 second and below 2 seconds). Hereinafter, cumulative reception means, for example, all values received multiple times in one acquisition period (e.g., 0.000 to 0.999 seconds) including the latest value or average value when abc sensor information is received multiple times in the one acquisition period.

In an embodiment, the sensor information may be raw data acquired in each unit period. In another embodiment, the sensor information may further include the raw data and/or processed data obtained by processing the raw data.

Specifically, the signal strength rssi of one sensor (e.g., abc sensor) may be acquired, and then at least one processed datum such as an average, a median, a minimum-maximum mean, a minimum value, or a maximum value for the signal strength may be acquired. Thereafter, the abc sensor may be matched to one piece of sensor information (rssi) (raw data or one processed datum) of the abc sensor in a one-to-one matching manner ("abc sensor-rssi value of the abc sensor"). That is, one sensor may be matched to each of a plurality of signal strength values, and accordingly a plurality of signal strength values may be acquired per sensor at a time point of one unit period.

Accordingly, referring to Table 1, even though the positioning sensors (151, 153, and 155) having the same identification number as that in t1 are selected in t2, more sensor information than in t1 is acquired in t2 because more sensor information is received in t2 than in t1, or a plurality of processed data is further matched to each corresponding sensor. In Table 1, more sensor information than the number of selected positioning sensors is acquired in t3 because a plurality of processed data is acquired for each sensor.

Thereafter, a possible positioning sensor pair is selected for the positioning sensor group selected for each unit period. When it is assumed that n positioning sensors 300 are provided in an indoor space for indoor positioning, and that i positioning sensors 300 (where i is a natural number satisfying 2≤i≤n) are selected as a positioning sensor group, $_iC_2$ positioning sensor pairs may be obtained. For example, referring to Table 1, three sensors are selected as a positioning group sensor at t1, and accordingly $_3C_2$ positioning sensor pairs may be obtained.

Thereafter, combination data|the positioning sensor pairs may be acquired for each unit period (S230). The combination data is a kind of parameter, and may mean intermediate data for deriving the final location of the mobile terminal 200 to be acquired in operation S400, which will be described later, from the sensor information acquired in operation S100 described above. Here, the combination data may include at least one of the above-described distance ratio ($r=r_b/r_a$), a first vector (position vector) Vp, and a second vector (direction vector) Vd. The first vector Vp refers to a position vector configured with the absolute coordinate values of the two positioning sensors constituting a positioning sensor pair. The second vector Vd refers to a direction vector configured with the relative coordinate values of one of the two positioning sensors constituting the positioning sensor pair with respect to the other one of the positioning sensors. The first vector Vp and the second vector Vd will be described in more detail later with reference to FIG. 5.

Thereafter, a variable group may be acquired based on the combination data (S240). Specifically, the variable group may include information about Apollonius' sphere (AS) calculated based on the combination data. That is, the combination data for each unit period constitutes an AS, and the variable group of the present disclosure may include the AS and a plurality of intercepts of the AS. Details will be described later with reference to FIGS. 6 to 8.

Next, in operation S300, the probability inference method is applied to the variable group. The probability inference method may be, for example, Bayesian estimation, and operation S300 may be a step of applying the Bayesian inference to the above-described variable group. Operation S300 may be performed by operations which are described below.

First, at least two sample data may be selected from among the plurality of variable groups acquired for the respective unit periods. Thereafter, a final probability distribution in which all sample data selected as a kind of hyper parameter is reflected may be calculated. In this case, the final probability distribution related to the location of a moving object may take the form of normal distribution defined by a standard deviation distributed based on a representative value and a median value. In this case, at least two sample data may be selected, and the final probability distribution may be calculated by multiplying each of the selected sample data by a filter function corresponding to each of the sample data. The filter function may include, for example, a Kalman filter (KF), an extended Kalman filter (EKF), a particle filter (PF), and a graph-based approach. However, the filter function is not limited thereto. Details will be described later with reference to FIG. 9. While the Bayesian estimation is described in the present disclosure as an example of the probabilistic inference technique of operation S300, other probability inference techniques may be used.

In operation S400, the final location of the mobile terminal 200 may be acquired based on the probability inference method used in operation S300. In operation S400 of calculating the final location of the mobile terminal, a circular distribution consisting of the representative value (median, average, or the like) of the probability distribution and the standard deviation distributed around the representative value calculated in operation S300 may be calculated. The probability distribution indicating the final location of the mobile terminal 200 will be described in more detail later with reference to FIGS. 10 and 11.

Hereinafter, a specific embodiment of the indoor positioning method according to an embodiment of the present disclosure will be described with reference to FIGS. 5 to 11.

FIG. 5 is a diagram illustrating a method of acquiring combination data according to an embodiment of the present disclosure.

Referring to FIG. 5, a positioning sensor group selected at a time point of one unit period (referred to as ta) in an indoor space is shown. Unique identification values corresponding to the locations where the positioning sensors 300 are installed are shown. A three-digit ID (a number from 101 to 110, or a number greater than or equal to 110 when h is a natural number greater than 10) and corresponding coordinates (x, y) are shown as a unique identification. In the embodiment of this figure, 10 positioning sensors 300 are selected as the positioning sensor group. For example, the 102 sensor has a unique identification including an ID of 102 and coordinate values of (0, 16). The coordinates for calculating the first vector Vp shown on the left side of this figure correspond to the absolute coordinate system based on the coordinates of the origin (0, 0). In this example, the 101 sensor is located at the origin (0, 0) as shown in the figure.

The coordinates for calculating the second vector Vd (d=(a, b)) shown on the right side of this figure correspond to a relative coordinate system in which the abc sensor present at the position of vector j=(1, 0) has coordinates corresponding to the new origin. The abc sensor located at the position of vector i=(1−25, 16) is expressed as a directional vector (second vector Vd) based on the new origin j. Although only one first vector Vp and only one second vector Vd illustrated in this figure, each of the vectors Vp and Vd may be obtained as many as $_kC_2$. First, a general formula for the intercept of the sphere for obtaining the AS may be easily derived using multiple ($_kC_2$) second vectors Vd in the relative coordinate system. For example, the general formula of the intercept as shown in Equation 4 may be derived from the relational expression of Equation 3 below.

$$\sqrt{x^2 + y^2 + z^2}, \sqrt{(x-a)^2 + (y-b)^2 + z^2} = m:n \qquad \text{Equation 3}$$

$$(x - a \cdot l)^2 + (y - b \cdot l)^2 + z^2 = (a^2 + b^2) \cdot (l^2 - 1) \qquad \text{Equation 4}$$

$$\left( l = \frac{m^2}{k}, k = m^2 - n^2 \right)$$

Thereafter, the intercept value calculated in the relative coordinate system may be transformed into the intercept value in the absolute coordinate system by adding the same to the position vector Vp of the new origin j of the relative coordinate system.

Here, the combination data will be described in more detail with reference to FIG. 6. FIG. 6 is a schematic diagram illustrating an exemplary method of calculating a variable group acquired according to an indoor positioning method according to an embodiment of the present disclosure.

FIG. 6 shows an AS and an intercept obtained by Equations 3 and 4 described above. The AS is an example of the "variable group" of the present disclosure. This figure is an example in which one positioning sensor pair ($B_1$, $B_2$) is selected in one unit period ta. In this case, the second vector (directional vector) Vd, which is an example of the combination data, may be acquired as a vector (a, b) pointing from $B_1$ to $B_2$. Due to the derivation of the directional vector, $B_1$ and $B_2$ expressed in a relative coordinate system having $B_1$ as the origin have coordinates of (0, 0) and (a, b), respectively. In this figure, the AS is formed as a set of points having a distance ratio r of m:n from the two positioning sensors $B_1$ and $B_2$. In other words, the AS acquired according to an embodiment of the present disclosure may be defined by the distance ratio (r=n/m; where r≠1) and the directional vector (a, b), that is, three factors r, a, and b.

Also, h is the installation height from the ceiling of the two positioning sensors (B1, B2). In this figure, a single AS corresponding to one unit period ta or one positioning sensor pair ($B_1$, $B_2$) is illustrated. An operation of obtaining a plurality of ASs will be described later with reference to FIGS. 7 and 8.

FIG. 7 is a diagram illustrating an example of the variable group acquired according to the indoor positioning method according to an embodiment of the present disclosure. FIG. 7 shows a plurality of ASs as one variable group. Referring to FIG. 7, the plurality of Apollonius spheres (AS1, . . . , ASn) including an AS acquired for a plurality of unit periods and an AS acquired for a plurality of positioning sensor pairs even within one unit period are shown. The final location coordinates of the mobile terminal 200 may be estimated by applying a probability inference method to be described later to the plurality of Apollonius spheres AS1, . . . , ASn.

FIG. 8 is a diagram illustrating another example of the variable group acquired according to the indoor positioning method according to an embodiment of the present disclosure. FIG. 8 shows a plurality of intercepts of a plurality of Apollonius spheres as another variable group. Referring to FIG. 8, ASs each acquired for a plurality of unit periods and intercepts 91 and 92 of the respective ASs acquired for a plurality of positioning sensor pairs even within one unit period are shown. For example, 91 and 92 may be intersection points on different axes, such as an x-axis and a y-axis, and may be an x-intercept and a y-intercept, respectively.

Since the intercepts 91 and 92 each have specific coordinates in one coordinate system, a distribution thereof may be exhibited as shown in, for example, FIG. 7.

As described above, based on the sensor information of the two selected positioning sensors 300, combination data (a distance ratio r and the second vector Vd consisting of a and b) may be used to create a variable group for determination of the final location. Thereby, the intercepts may be easily computed, and the absolute positions of the intercepts may be calculated by obtaining the vector sum of the result of the computation and the first vector Vp, which is the position vector of the positioning sensor. Accordingly, accurate and fast indoor positioning may be implemented even with a very large number of positioning sensors 300.

Hereinafter, the probability inference operation S300 according to an embodiment of the present disclosure will be described with reference to FIG. 9.

FIG. 9 is a diagram for illustration a probability inference method applied to the indoor positioning method according to an embodiment of the present disclosure. FIG. 9 shows a final location distribution $S_f$ of the mobile terminal 200 calculated by applying the Bayesian estimation method based on a prior probability distribution $S_1$, sample intercepts P selected as sample data, and a sample probability distribution $S_2$ of the sample intercepts. In the present disclosure, a conditional probability distribution $S_f$ of the final location of the mobile terminal 200 is obtained as a parameter to be estimated based on given data (e.g., a variable group based on sensor information).

$S_1$ may be a location of the mobile terminal 200 pre-acquired as a prior distribution of a parameter. When there is no information about the current distribution of the parameter, $S_1$ may be a non-information distribution such as a uniform distribution or a normal distribution centered at 0. The non-information distribution has the previously measured or predicted position as an average may be formed in every unit period. $S_1$ has the mean m1 as a representative value and a probability distribution such as $S_1$ distributed around m1. Although the mean of $S_2$, which will be described later, is not shown, the mean and the same probability distribution as that of $S_2$ distributed around the mean are obtained.

$S_2$ may be a distribution of simple intercepts P selected from among the intercepts P of a plurality of Apollonius spheres (AS) calculated from sensor information such as signal strength (RSSI) newly acquired by the indoor positioning server 100. As an example, the sample probability distribution $S_2$ may correspond to a distribution of two intercepts P derived from among a plurality of ASs acquired as a variable group for one unit period ta. As another example, the sample probability distribution $S_2$ may correspond to a probability distribution related to signal strengths from the two positioning sensors 300.

In this case, the final location of the mobile terminal 200 may be estimated precisely and accurately by applying Bayesian estimation to all newly acquired or added sample intercepts P of the ASs. $S_f$ is a posterior distribution of the parameter μ, and represents a conditional probability distribution for the parameter μ in a given state when the above-described sample data ($x_1$, . . . , $x_N$) (for example, $S_2$ in the present disclosure) is given. It may be expressed in a mathematical form as Equation 5. $S_f$ is output data to be finally acquired in the present disclosure.

$$S_f = p(\mu | x_1, \ldots, x_N) \qquad \text{Equation 5}$$

Although only one sample probability distribution $S_2$ is shown in this figure, a plurality of sample data may be selected. In this case, a conditional probability distribution $S_f$ of the final location may be derived by correcting the original function (e.g., Equation 5) of Bayesian estimation every time sample data is added.

Referring back to FIG. 9, the final location distribution $S_f$ has $m_f$, which is the mean, as a representative value, and the same probability distribution as $S_f$ distributed around $m_f$. As described above, according to the indoor positioning method according to an embodiment of the present disclosure, the result value related to the location of a moving object may be output in the form of a probability distribution, is therefore easy to process according to the user's need and easy to combine with other sensor information. Specifically, since the location of the moving object of the present disclosure is output as a normal distribution or a circular distribution defined by the coordinates (of the median or standard deviation), may be easily combined with information acquired by sensors (e.g., an image sensor or a GPS sensor) other than the positioning sensors 300. In contrast, when the final location value is calculated as a specific point rather than a probability distribution, the precision may be improved, but the error may increase and combination with other sensor data may not be easily. Therefore, the accuracy of position estimation may be improved by combining the final location distribution calculated in the form of a probability distribution of the present disclosure and the location distribution in the form of a probability distribution of other sensors.

Hereinafter, an actual implementation of the indoor positioning method according to an embodiment of the present disclosure will be described with reference to FIGS. 10 and 11. FIG. 10 is a schematic diagram illustrating a method of calculating a final location of a mobile terminal at a point of time according to the indoor positioning method according to an embodiment of the present disclosure, and FIG. 11 is a schematic diagram illustrating a method of calculating a final location of a mobile terminal at another point of time according to the indoor positioning method according to an embodiment of the present disclosure. In the following description, description of elements already described above will be omitted or simplified.

FIGS. 10 and 11 illustrate final positions Pf of the mobile terminal 200 estimated at 10:28:30 and 10:28:43 respectively by the indoor positioning server 100 when the period is in units of sec.

First, referring to FIG. 10, 70a is an output screen image provided through a display provided in the indoor positioning server 100 or the mobile terminal 200, and 70b represents a time point of one unit period (10:28:30) (hereinafter, simply referred to as a "tp time point") during movement of a vehicle having the mobile terminal 201, which is provided with the output screen image of 70a, in an indoor space. In this case, referring to 70a, a plurality of positioning sensors 300 is installed in an indoor space L such as a parking space, and a unique identification is assigned to the location of each of the positioning sensors. The location of the positioning sensor 300 may be output as a sensor UI (BS) in the output screen image 70a. In 70a, as a plurality of variable groups acquired in the indoor space L at time tp, intercepts 71 and 72 of a plurality of ASs may be output. In this regard, when the output screen image 70a is viewed as a whole in one coordinate system, the intercepts 71 and 72 may be distributed in the absolute coordinate system as shown in the figure.

Based on the plurality of variable groups 71 and 72, the final location distribution Pf1 may be acquired according to the indoor positioning method of the present disclosure described above. The final location distribution Pf1 may be calculated in the form of a circle having the representative value (mean or median) of the probability distribution $S_f$ calculated based on the variable groups 71 and 72 as a center thereof, and the standard deviation of the probability distribution $S_f$ as a radius thereof.

Next, referring to FIG. 11, 80a is an output screen image provided through the display provided in the indoor positioning server 100 or the mobile terminal 200, and 80b represents a time point of one unit period (10:28:43) (hereinafter, simply referred to as a "tq time point") during movement of a vehicle having the mobile terminal 201, which is provided with the output screen image of 80a, in an indoor space. In this case, referring to 80a, a plurality of positioning sensors 300 is installed similarly. In 80a, as a plurality of variable groups acquired in the indoor space L at time tq, intercepts 81 and 82 of a plurality of ASs may be output. In this case, when the output screen 80a is viewed as a whole in one coordinate system, the intercepts 81 and 82 may be distributed in the absolute coordinate system as shown in the figure.

Based on the plurality of variable groups 81 and 82, the final location distribution Pf2 may be acquired according to the indoor positioning method of the present disclosure described above. The final location distribution Pf2 may be calculated in the form of a circle having the representative value (mean or median) of the probability distribution $S_f$ calculated based on the variable groups 81 and 82 as a center thereof, and the standard deviation of the probability distribution $S_f$ as a radius thereof.

It may be seen from FIGS. 10 and 11 that the location of the mobile terminal 200 is finally changed while 13 seconds elapse. Positioning sensor groups (or pairs) selected each time point (tp, tq) may vary, and accordingly, the number and distribution of acquired variable groups may also vary. In this way, a pair of positioning sensors used for indoor positioning is selected flexibly according to the movement of the mobile terminal 200 that changes in real time, and accordingly, precise and fast positioning may be implemented even in a space where GPS reception is rarely possible (especially an indoor space).

The devices and/or system described above may be implemented as a hardware component, a software component, and/or a combination of the hardware component and the software component. The devices and components described in the embodiments may be implemented using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications running on the operating system. In addition, the processing device may access, store, manipulate, process, and generate data in response to execution of the software. Although it is described for simplicity that one processing device is used, one of ordinary skill in the art will understand that the processing device includes a plurality of processing elements and/or a plurality of types of processing elements. For example, the processing device may include a plurality of processors or one processor and one controller. Other processing configurations such as parallel processors may also be included.

The software may include a computer program, code, instructions, or a combination of one or more thereof, and configure the processing device to operate as desired or may instruct the processing device independently or collectively. The software and/or data may be permanently or temporarily embodied in any kind of machine, component, physical device, virtual equipment, computer storage medium or device, or a transmitted signal wave so as to be interpreted by the processing device or to provide instructions or data to the processing device. The software may be distributed over networked computer systems and stored or executed in a distributed manner. The software and data may be stored in one or more computer-readable recording media.

The method according to the embodiment may be implemented in the form of program instructions that may be executed by various computer means and recorded on a computer-readable medium. The computer-readable medium may include program instructions, data files, data structures, and the like, alone or in combination. The program instructions recorded on the medium may be specially designed and configured for the embodiments, or may be known and available to those skilled in the art of computer software. Examples of the computer-readable recording medium include magnetic media such as hard disks, floppy disks and magnetic tapes, optical media such as CD-ROMs and DVDs, and magneto-optical media such as floptical disk, and hardware devices specially configured to store and execute program instructions, such as ROMs, RAMs, and flash memories. Examples of the program instructions include not only machine language codes such as those generated by a compiler, but also high-level language codes that may be executed by a computer using an interpreter or the like. The hardware devices described above may be configured to operate as one or more software modules to perform the operations of the embodiments, and vice versa.

Although preferred embodiments of the present disclosure have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Accordingly, the spirit of the present disclosure should not be limited to the embodiments described above. The scope of the disclosure should be determined by the appended claims and their legal equivalents, and all changes coming within the meaning and equivalency range of the appended claims are intended to be embraced therein.

The invention claimed is:

1. An indoor positioning method for measuring a location of a mobile terminal using the mobile terminal and a plurality of positioning sensors communicating therewith, the method comprising:
   selecting a period for acquiring sensor information related to a relationship between the mobile terminal and the positioning sensors;
   acquiring a variable group corresponding to a positioning sensor selected from among the plurality of positioning sensors for each of unit periods of the selected period, the sensor information being acquired from the plurality of positioning sensors;
   applying a probability inference method to the variable group; and
   acquiring a final location of the mobile terminal based on the probability inference method,
   wherein the sensor information comprises signal strengths received by the mobile terminal from the positioning sensors, and a unique identification of the positioning sensors.

2. The method of claim 1, wherein the acquiring of the variable group comprises:
   selecting a positioning sensor group included in a sensor information receiving range from among the plurality of positioning sensors for each of the unit periods, the positioning sensor group comprising at least two positioning sensors;
   selecting a possible positioning sensor pair for the selected positioning sensor group for each of the unit periods;
   acquiring combination data about the positioning sensor pair for each of the unit periods; and
   acquiring the variable group based on the combination data.

3. The method of claim 2, wherein the combination data comprises:
   a distance ratio between the mobile terminal and each of the two positioning sensors constituting the positioning sensor pair;
   a first vector configured by absolute coordinates of each of the two positioning sensors constituting the positioning sensor pair; and
   a second vector configured by relative coordinates of one of the two positioning sensors constituting the positioning sensor pair with respect to the other one of the positioning sensors.

4. The method of claim 3, wherein the variable group comprises:
   information on a Apollonius' sphere calculated based on the unique identification and signal strength of the positioning sensor pair, the information including: the Apollonius sphere configured with the combination data for each of the unit periods; and
   a plurality of intercepts of the Apollonius sphere for each of the unit periods.

5. The method of claim 2, wherein, when the number of positioning sensors selected as the positioning sensor group is k (where k is a natural number satisfying $2 \leq i \leq n$), the positioning sensor pair comprises positioning sensor pairs acquired as many as a combination $_kC_2$.

6. The method of claim 3, wherein the applying of the probability inference method comprises applying a Bayesian inference technique to the combination data, the applying of the Bayesian inference technique comprises:
   selecting at least two sample data from a plurality of variable groups; and
   calculating a probability distribution related to the location of the mobile terminal having a form of normal distribution by multiplying each of the selected sample data by a corresponding filter function.

7. The method of claim 6, wherein the acquiring of the final location of the mobile terminal comprises:
   calculating a circular distribution composed of a representative value selected from a median or a mean of the probability distribution, and a standard deviation distributed around the median.

8. A computer program stored in a recording medium for executing the method of claim 1 using a computer.

9. An indoor positioning system comprising:
   an indoor positioning server configured to communicate with a mobile terminal and a plurality of positioning sensors, wherein the indoor positioning server is configured to:
select a period for acquiring sensor information related to a relationship between the mobile terminal and the positioning sensors;
acquire a variable group corresponding to a positioning sensor selected from among the plurality of positioning sensors for each of unit periods of the selected period, the sensor information being acquired from the plurality of positioning sensors;
apply a probability inference method to the variable group; and
acquire a final location of the mobile terminal based on the probability inference method,
wherein the sensor information comprises signal strengths received by the mobile terminal from the positioning sensors, and a unique identification of the positioning sensors.

10. The system of claim 9, wherein in acquiring the variable group, the indoor positioning server is configured to:
select a positioning sensor group included in a sensor information receiving range from among the plurality of positioning sensors for each of the unit periods, the positioning sensor group comprising at least two positioning sensors;
select a possible positioning sensor pair for the selected positioning sensor group for each of the unit periods;
acquire combination data about the positioning sensor pair for each of the unit periods; and
acquire the variable group based on the combination data.

11. The system of claim 10, wherein the combination data comprises:
a distance ratio between the mobile terminal and each of the two positioning sensors constituting the positioning sensor pair;
a first vector configured by absolute coordinates of each of the two positioning sensors constituting the positioning sensor pair; and
a second vector configured by relative coordinates of one of the two positioning sensors constituting the positioning sensor pair with respect to the other one of the positioning sensors.

12. The system of claim 11, wherein the variable group comprises:
information on a Apollonius' sphere calculated based on the unique identification and signal strength of the positioning sensor pair, the information including: the Apollonius sphere configured with the combination data for each of the unit periods; and
a plurality of intercepts of the Apollonius sphere for each of the unit periods.

13. The system of claim 10, wherein, when the number of positioning sensors selected as the positioning sensor group is k (where k is a natural number satisfying 2≤i≤n), the positioning sensor pair comprises positioning sensor pairs acquired as many as a combination $_kC_2$.

14. The system of claim 11, wherein, in applying the probability inference method, the indoor positioning server is configured to:
apply a Bayesian inference technique to the combination data, the applying of the Bayesian inference technique comprises:
select at least two sample data from a plurality of variable groups; and
calculate a probability distribution related to the location of the mobile terminal having a form of normal distribution by multiplying each of the selected sample data by a corresponding filter function.

15. The system of claim 14, wherein, in acquiring the final location of the mobile terminal, the indoor positioning server is configured to:
calculate a circular distribution composed of a representative value selected from a median or a mean of the probability distribution, and a standard deviation distributed around the median.

* * * * *